Sept. 21, 1954  T. W. DRURY  2,689,700
SWITCH MOUNTING
Filed Feb. 7, 1952  2 Sheets-Sheet 1
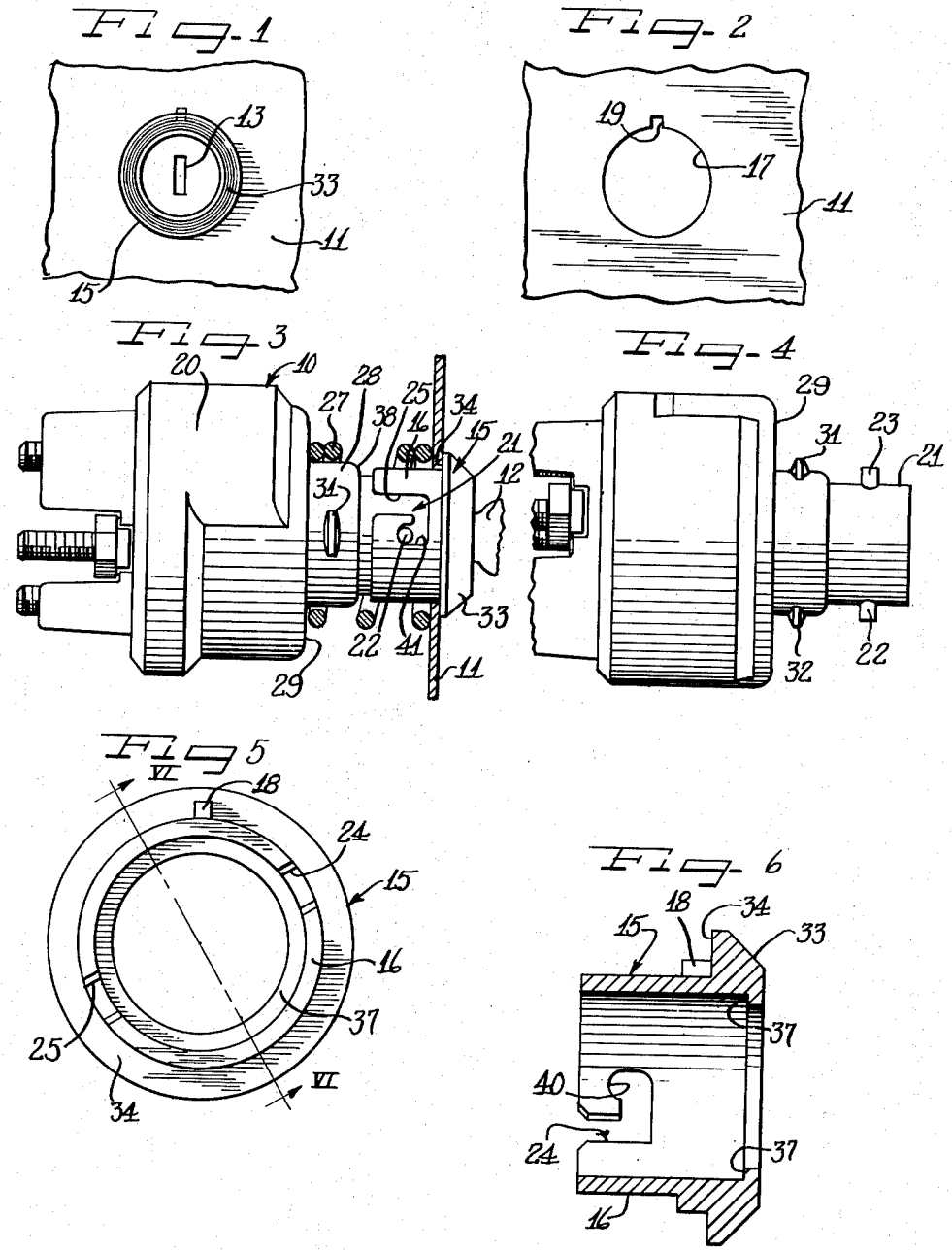
Inventor
Thomas W. Drury
by Hill, Sherman, Meroni, Gross & Simpson
Attys

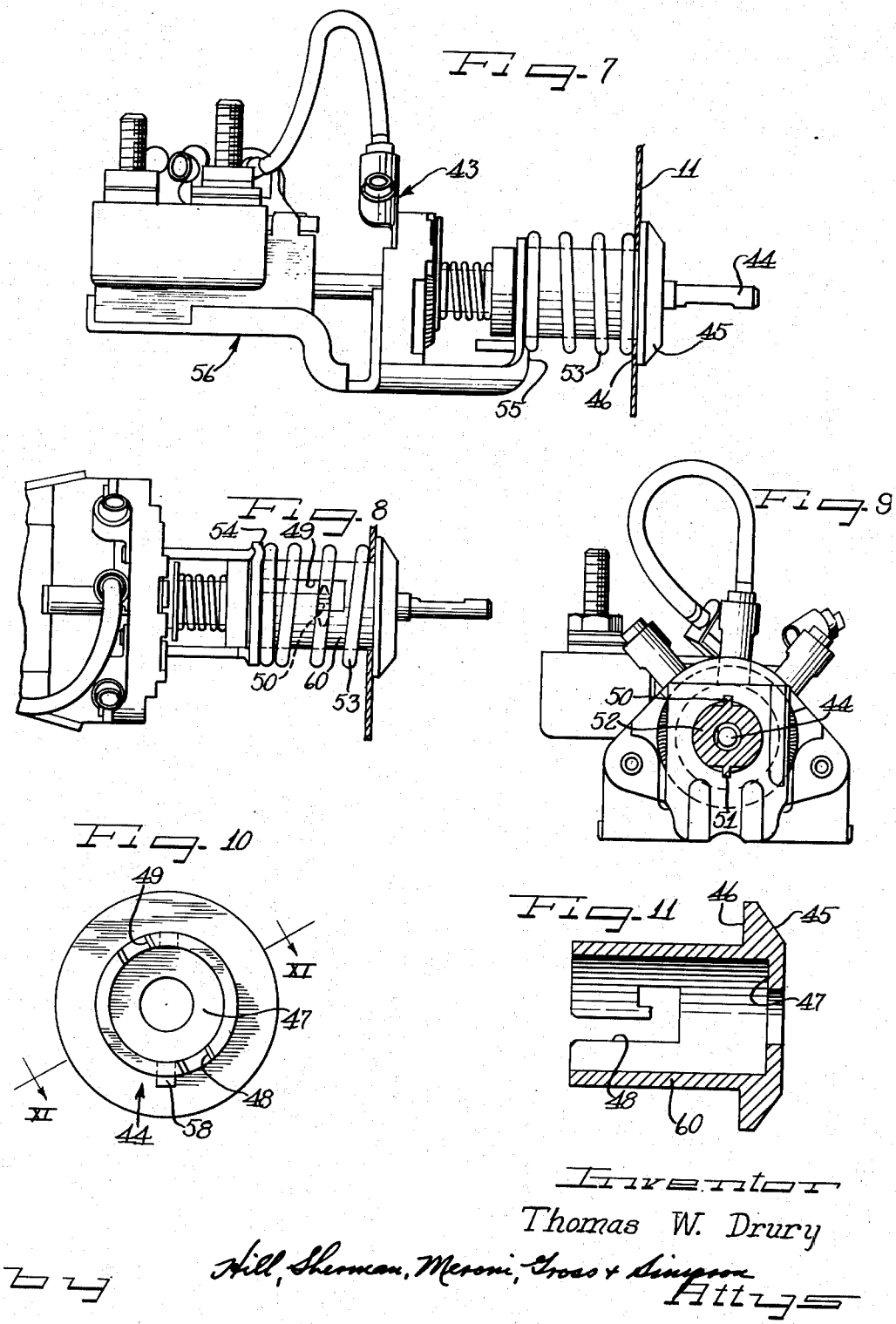

Patented Sept. 21, 1954

2,689,700

UNITED STATES PATENT OFFICE 2,689,700

SWITCH MOUNTING

Thomas W. Drury, Sturgis, Mich., assignor to Kingston Products Corporation, Kokomo, Ind., a corporation of Indiana Application February 7, 1952, Serial No. 270,410

2 Claims. (Cl. 248—27)

1

This invention relates to improvements in a switch mounting structure and more particularly to improvements in the mounting structure securing switches to the instrument panel of a motor vehicle.

Heretofore, the structures for securing ignition switches and the like to the instrument panels of motor vehicles have not been altogether satisfactory inasmuch as there has been a tendency for the mounting bezel to become detached from the switch housing with resulting inconvenience to the owner of the vehicle.

Accordingly, it is an important object of the present invention to provide a switch mounting structure which is simple and rugged and which will withstand the prolonged vibratory forces which may occur in the operation of a motor vehicle.

It is a further important object of the present invention to provide a switch mounting structure by which a switch may be readily assembled with the instrument panel of a motor vehicle or the like.

Other and further important objects of this invention will be apparent from the disclosures in the specification and the accompanying drawings.

On the drawings:

Figure 1 is a fragmentary front elevational view of a starter and ignition switch assembly secured to the instrument panel of a motor vehicle by means of a mounting structure according to the present invention;

Figure 2 is a fragmentary elevational view of a portion of the panel of a motor vehicle for receiving the ignition switch and mounting structure shown in Figure 1;

Figure 3 is a front elevational view of the starter and ignition switch assembly and mounting structure with a portion of the mounting spring broken away and in section;

Figure 4 is a fragmentary top plan view of the structure of Figure 3, but with the bezel and mounting spring removed;

Figure 5 is a rear elevational view of a bezel according to the present invention;

Figure 6 is a longitudinal sectional view taken substantially along the line VI—VI of Figure 5;

Figure 7 is a side elevational view of a headlight switch assembly secured to the instrument panel of a motor vehicle by means of a mounting structure according to the present invention with instrument panel shown in section;

Figure 8 is a fragmentary top plan view of the structure of Figure 7;

Figure 9 is a transverse sectional view illustrat-

2 ing the bayonet lugs formed in the mounting sleeve, the bezel being removed from the sleeve;

Figure 10 is a rear elevational view of a bezel according to the present invention; and Figure 11 is a longitudinal sectional view taken substantially along the line XI—XI of Figure 10.

As shown on the drawings:

In Figures 1 to 6 is illustrated a mounting structure for securing a starter and ignition switch assembly 10 to a panel 11, such as the instrument panel of a motor vehicle. The starter and ignition switch assembly 10 may, for example, be of the type wherein turning of the key 12 to the left of the "off" position will close the circuits to the various accessories such as a radio and heater while maintaining the ignition circuit open. Turning the key part way to the right will close the ignition circuit as well as the accessory circuits, while turning the key all the way to the right will switch out the accessory circuits and close the circuit to the starter for the vehicle engine as well as maintaining the ignition circuit closed. When the switch is locked, the key hole 13 is in its normal vertical position shown in Figure 1.

The switch mounting structure includes a bezel 15 having a sleeve portion 16 for insertion into the opening 17 in the instrument panel shown in Figure 2. For preventing rotation of the bezel in the opening 17, the bezel is provided with a lug 18 which fits into a notch 19 of the opening. The switch housing 20 is provided with a tubular nose portion 21 for telescoping within the sleeve portion 16 of the bezel. This nose portion 21 carries a pair of opposed pins 22 and 23 for cooperation with opposed J-shaped slots 24 and 25 in the bezel sleeve portion 16 as shown in Figure 3. A compression spring 27 surrounds an enlarged switch housing sleeve portion 28 and the sleeve portion 16 of the bezel, with the front end of the spring abutting the panel 11 and the rear end abutting a shoulder 29 provided by the switch housing 20. As seen in Figure 4, opposed ears 31 and 32 are provided for retaining the rear end of the spring 27 against the shoulder 29.

As seen in Figures 3 and 6, the bezel has a beveled annular face 33 for providing a finished appearance from the interior of the vehicle and an annular retaining shoulder 34 for retaining the bezel in assembly with the instrument panel. A further internal lip 37 opposes the forward end of the nose portion 21 of the switch housing in assembled relation of the bezel and switch. It will be observed that the thickness of the bezel sleeve portion annular wall corresponds generally to the height of the shoulder 38 provided by the switch housing so that the external surface of the sleeve portion 16 is substantially of the same diameter as the external wall of the enlarged diameter sleeve portion 28 of the switch housing 20. The spring 27 may thus telescope closely over the sleeve portion 28 and bezel sleeve portion 16 and be properly held in position between shoulder 29 and panel 11.

In assembling the switch housing with the instrument panel 11, the bezel 15 is inserted through the opening 17 from the front, and the switch nose portion 21 with the spring 27 assembled therewith by means of ears 31 and 32 is then inserted into the sleeve portion 16 of the bezel, the spring telescoping over the sleeve portion 16. With the pins 22 and 23 registered with the slots 24 and 25, the switch housing is next moved bodily forward to compress the spring 27 and move the pins 22 and 23 into the slots 24 and 25. The housing is then twisted to engage the pins 22 and 23 in the blind end portions 40 and 41 of the slots where the pins are retained by virtue of the loading of the spring 27.

In the embodiment of Figures 7 to 11, the mounting structure of the present invention is illustrated as it would be employed in connecting a dome, instrument and headlight switch assembly 43 to the instrument panel 11. The switch assembly 43 may be of the type having a shaft 44 which is rotatable to the left to light a dome light and is rotatable to the right to vary the brightness of the instrument illumination, and is further axially movable to additionally light the parking lights or headlights. The bezel in this case is similar to that shown in Figures 5 and 6 having a beveled front annular face 45, an external shoulder 46 and an internal shoulder 47. Also, the bezel is provided with a pair of diametrically opposed J-shaped slots 48 and 49 similar to those shown in Figures 5 and 6. In this case, however, the pins or lugs 50 and 51 for cooperating with the slots 48 and 49 are formed from the metal of the switch housing nose portion 52. Further, compression spring 53 is seated at its rear end against a shoulder 54 provided by a flange 55 of the switch mounting plate 56, Figure 1. The bezel 44 is again provided with a lug 58 for preventing rotation of the bezel in the instrument panel. The spring 53 telescopes over the bezel sleeve portion 60, which, in turn, telescopes over the switch housing nose portion 52.

The assembly of this switch with the instrument panel is similar to that of the first embodiment and the specific description of the assembly of the second embodiment is therefore deemed unnecessary.

It will be apparent that there is provided according to the present invention a switch mounting structure which is simple and rugged, and will not accidentally become disassembled or loose due to vibration of the motor vehicle. Further, the mounting structure is readily assembled to retain a switch with the instrument panel of a motor vehicle or the like, and need not be manufactured to close tolerances since the spring tension will take up any looseness.

It will be understood that modifications and variations may be effected without departing from the scope of the novel concepts of the present invention.

I claim as my invention:

1. A mounting structure comprising a bezel having a tubular sleeve portion for insertion through the instrument panel of a motor vehicle or the like and a retaining flange for abutment against the front surface of said panel, said sleeve portion having a slot including a slot portion extending inwardly from the rear edge of said sleeve portion and a reentrant blind end portion extending from said inwardly extending slot portion and providing a notch, a housing having a generally cylindrical nose portion closely telescoping into said sleeve portion of said bezel in sliding relation thereto, said nose portion having a lug extending from the periphery thereof for traveling in said slot and engaged in said notch to retain said bezel with said nose portion, and a compression spring telescoping over said bezel sleeve portion and abutting at one end thereof the rear surface of said instrument panel, said housing providing a shoulder abutting the other end of said spring said housing also providing an enlarged secondary generally cylindrical nose portion between said shoulder and said nose portion, and clip means mounted thereon detachably engaging said other end of said spring bottomed against said shoulder, and said spring acting to retain said lug in said notch.

2. A mounting structure as claimed in claim 3 wherein the housing nose portion within the bezel sleeve portion has substantially the same axial length as the bezel sleeve portion and the secondary nose portion has substantially the same diameter as the bezel sleeve portion whereby the spring may be detachably mounted on the secondary nose portion in generally concentric relationship with the bezel sleeve and the housing nose portion engaging the bezel sleeve during assembly of the mounting structure.

References Cited in the file of this patent

UNITED STATES PATENTS

| Number | Name | Date |
|---|---|---|
| 1,158,611 | Whitmore | Nov. 2, 1915 |
| 1,468,985 | Whittington | Sept. 25, 1923 |
| 2,057,885 | Douglas | Oct. 20, 1936 |
| 2,473,252 | Hutt | June 14, 1949 |
| 2,558,852 | Jacobi | July 3, 1951 |